May 16, 1950 B. Z. BERMAN 2,507,882
SELF-TAPPING SCREW

Filed March 5, 1947 2 Sheets-Sheet 1

INVENTOR.
BENOF Z. BERMAN
BY
Rackenbach & Hirschman
ATTORNEYS

May 16, 1950  B. Z. BERMAN  2,507,882
SELF-TAPPING SCREW

Filed March 5, 1947  2 Sheets-Sheet 2

INVENTOR.
BENOF Z. BERMAN
BY
Rackenbach & Hirschman
ATTORNEYS

Patented May 16, 1950

2,507,882

UNITED STATES PATENT OFFICE 2,507,882

SELF-TAPPING SCREW

Benof Z. Berman, New York, N. Y., assignor to
The Bermack Company, New York, N. Y., a
partnership Application March 5, 1947, Serial No. 732,474

3 Claims. (Cl. 85—47)

This invention relates to self-tapping screws and more particularly to self-tapping screws adapted for use in plastic materials.

When conventional self-tapping screws are inserted in an unthreaded aperture of a plastic material, internal stresses are set up within the material which often lead to fracture or tearing away of the material. In order to avoid this danger of failure of material, the usual procedure is to arrange thicker boss sections, therefore using more of the plastic material than is needed.

In addition, the chips resulting from the cutting action usually accumulate to such an extent that they clog up the cutting edges of the screw, thus setting up reaction forces which make it difficult to rotate the screw in the guide hole. Greater force must be applied with the resultant danger of material fracture.

In most prior disclosures, the single cutting edge used has a tendency to drive the screw away from the perpendicular and also cut an uneven thread of various thicknesses as it rotates in the bored opening, thus causing great pressure at one point in the plastic material.

Where multiple cutting surfaces are used in other disclosures, the self-tapping screw has been designed to work in a metal body and the cutting surface supplied would be wholly inadequate for tapping the plastic materials. In addition, the cutting angles of the cutting edges are so arranged that they do not actually cut a thread but rather indent or compress the material, which would be quite detrimental to plastic materials.

It is therefore the main object of this invention to provide a self-tapping screw which may be used as efficiently in plastic material as in metals or heat treated metals.

Another object of this invention is to provide a self-tapping screw having diametrically opposed cutting edges which will present concentric action in the aperture provided for it.

Still another object of this invention is to provide a chip reservoir with each cutting edge which will effectively divert chips away from the cutting edge as they are formed.

Another object of this invention is to provide a self-tapping screw having diametrically opposed cutting surfaces or pairs of cutting surfaces or cutting surfaces arranged 120° apart, so that the forces applied in driving the screw are divided evenly between the cutting edges and thus lessen the required driving torque. The resultant even pressure permits a thinner boss around the aperture and therefore a saving of plastic materials.

The invention also contemplates the use of the above-mentioned cutting surfaces in connection with the conventional drive screw wherein said drive screw cutting edges would be normal to the threads of said drive screw.

The novel concentric cutting action of my self-tapping screw may also be secured by a series of off-center slots diametrically opposite each other and also by three slots disposed 120° apart throughout the periphery of the screw.

Other objects and advantages will appear from the following description considered in connection with the accompanying drawings, in which.

Figure 1:
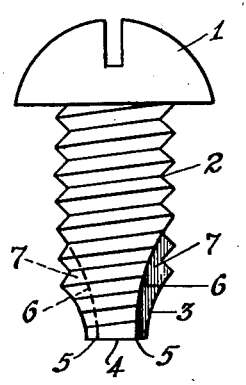
Fig. 1 is an elevational view of a self-tapping screw showing one extent of the chip reservoir.
Figure 2:
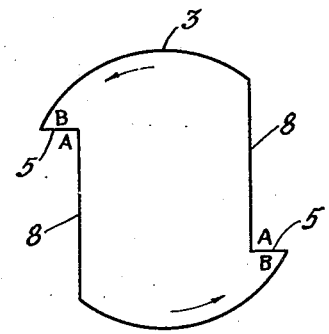
Fig. 2 is an end elevational view of the screw shown in Fig. 1 embodying one type of diametrically opposed cutting edge.

Referring now to the drawings and in particular to the self-tapping screw shown in Fig. 1, this self-tapping screw comprises a head 1, which may be, for example, slotted as shown in the drawing or it may be a socket head, internal or external, or any of the standard screw heads well known in the art. A threaded body portion 2 having any number of threads per inch extends from the head 1 to the pilot portion 3 which is located at the entering end 4 of the screw. A cutting edge 5 extends lengthwise of the screw to present a curved surface 6 which serves to deflect chips away from said cutting edge 5. The chip reservoir 7 formed by the curved surface 6 may be any predetermined length which, for example, may extend the length of the pilot portion 3 or penetrate a distance into the thread portion 2 of the screw.

Referring now to the drawings of the end elevational view shown in Figs. 2, 3, 4, 5, 6 and 7, the self-tapping screw comprises two diametrically opposite cutting edges 5, cut in the pilot 3, which form a 90° angle A with their respective diametrically opposite cutout lines 8 which lie parallel to each other. The cutting edge angle B is less than 90° in this embodiment.

Figure 3:
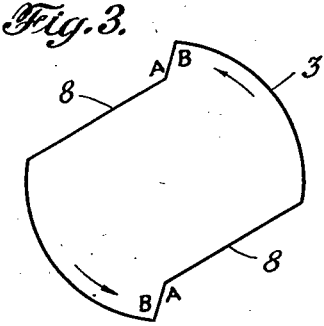
Fig. 3 is an end elevational view of Fig. 1, embodying a different angle of said cutting edge.

In Fig. 3, the self-tapping screw end is cut in the same diametrically opposite fashion except that the central angle A is obtuse while the angle B of the cutting edge is 90°.

Figure 4:
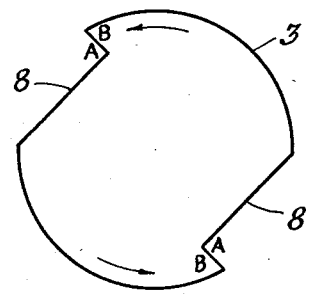
Fig. 4 is an end elevational view of Fig. 1 embodying still another angle of said cutting edge.

In Fig. 4, the self-tapping screw cutting edge angle B is again 90°, but the central angle A is also 90°.

Figure 5:
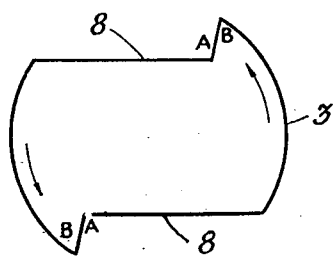
Fig. 5 is an end elevational view of Fig. 1, embodying another angle of said cutting edge.

In Fig. 5, the cutting edge angle B is shown less than 90° while the central angle A is greater than 90°.

Figure 6:
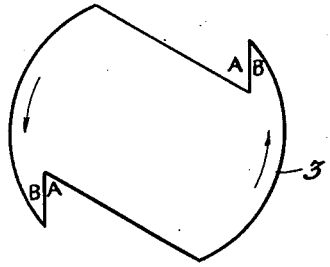
Fig. 6 is an end elevational view of Fig. 1, embodying still another angle of said cutting edge.

In Fig. 6, the cutting edge angle B is less than 90°, while the central angle A is also less than 90°.

Figure 7:
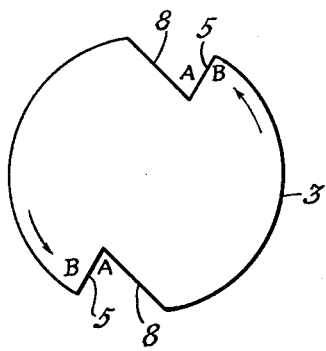
Fig. 7 is an end elevational view of Fig. 1, showing other angles of said cutting edge.

In Fig. 7, the cutting edge angle B is 90°, while the central angle A is less than 90°.

Figure 8:
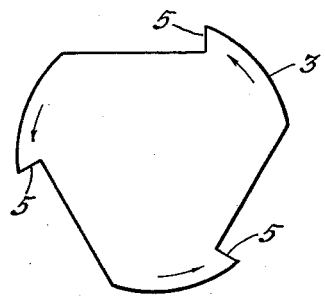
Fig. 8 is an end elevational view of Fig. 1, showing three cutting edges set 120° apart.
Figure 9:
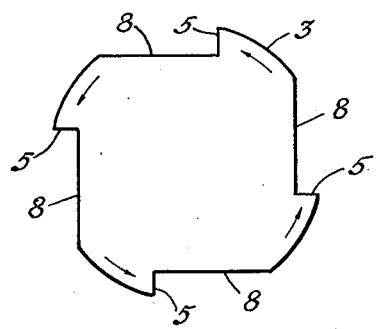
Fig. 9 is an end elevational view of a self-tapping screw showing two diametrically opposite pairs of cutting edges.

In Fig. 8, the cutting edges 5 and the cut-out lines 8 are shown arranged 120° apart, while in Fig. 9, the embodiment shows diametrically opposed pairs of cutting edges 5 and cut-out lines 8.

The embodiment shown in Figs. 8 and 9 of the drawings may have the various combinations of cutting edge angles B and central angles A as they are shown in Figs. 2, 3, 4, 5, 6 and 7.

Figure 10:
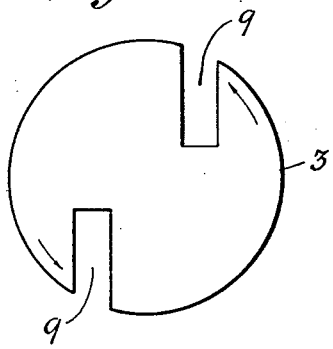
Fig. 10 is an end elevational view of Fig. 1, embodying a screw with two off-center slots.

In Fig. 10, the concentric cutting action is secured by two off-center slots 9, 9, diametrically opposite each other.

Figure 11:
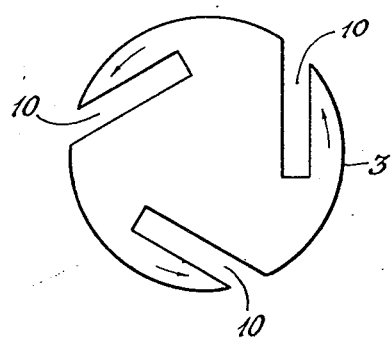
Fig. 11 is an end elevational view of Fig. 1, embodying a screw with three slots 120° apart from each other.

In Fig. 11, the concentric cutting action is secured by three slots 10 disposed 120° apart throughout the periphery of the screw.

This diametrically opposite arrangement of cutting surfaces may be applied to drive screws as well as self-tapping screws. In addition, the self-tapping screw may use the embodiment set forth above in combination with multiple thread leads. In the use of the above embodiments in connection with drive screws, the cutting edge is arranged normal to the threads which would include the various thread helix angles.

The operation of the device is as follows:

A proper size hole is drilled in the metal or plastic material to accommodate a predetermined self-tapping screw. The pilot 3 of my self-tapping screw is placed in the hole and rotated with the proper instrument which is dependent on the type of head 1 used with said self-tapping screw. The concentric action of the diametrically opposite cutting edges 5 causes the screw to enter the hole in perfect alignment. As the metal or plastic material is chipped away by the cutting edges 5, said chips enter the chip reservoir 6 and are deflected away from the cutting edges 5, thus preventing said chips from clogging the cutting edges 5. The screw threads 2 then follow the grooves in the manner well known in the art.

As will be seen from the above description, the invention discloses a self-tapping screw for metals or plastic, having diametrically opposed cutting surfaces arranged singly, in pairs, or 120° apart so that the required driving torque is lessened due to the fact that the driving force is evenly divided between the cutting edges.

In addition, the even pressure caused by the concentric revolving motion of the screw permits a thinner boss around the aperture with the attendant saving especially of plastic material. This saving of plastic is a concomitant of the lessened danger of fracture and tearing away of material which results when the pressure is uneven during the tapping operation.

The invention also provides an efficient chip reservoir which carries the cut-away chips away from the rotating edges and thus prevents binding and clogging during the tapping operation which is especially bad when tapping is done in plastic materials.

While, in disclosing the principles of my invention and their preferred embodiments, I have described various detailed structure and relationship, it will be understood that such embodiments and details are given by way of example only and not as limiting the scope of my invention. Thus, while I have shown the slots, for instance, in Figs. 10 and 11, of single depth, they may obviously be of the "stepped" i. e., double or triple ledge, form known in the art.

I claim:

1. A self-tapping screw for insertion into and maintenance in an aperture as a fastener and for effecting tapping of the side walls of said aperture by a concentric cutting action, said screw having a head, a threaded body and a threaded reduced end portion, a plurality of grooves in said screw, one face of said grooves forming a cutting edge with the peripheral surface of said screw, said face being a planar surface and said planar surface forming with the plane tangent to the circumference of the screw at the cutting edge a cutting edge angle of less than 90°, said grooves extending into the screw deeper than the minor diameter of the screw at the point where said grooves form substantial chip reservoirs, said grooves being located in the reduced end portion, extending up into the body portion of said screw and equi-distant from one another.

2. A self-tapping screw as claimed in claim 1 wherein said plurality of grooves constitute a pair of grooves diametrically opposed.

3. A self-tapping screw as claimed in claim 1 wherein said grooves extend up only a short distance into the body portion and terminate a substantial distance from the head of said screw.

BENOF Z. BERMAN.

REFERENCES CITED

The following references are of record in the file of this patent:

UNITED STATES PATENTS

| Name | Number | Date |
|---|---|---|
| Lee | 551,354 | Dec. 10, 1895 |
| Holmes | 1,288,893 | Dec. 24, 1918 |
| Trotter | 1,909,476 | May 16, 1933 |
| Rosenberg | 2,165,009 | July 4, 1939 |
| Meersteiner | 2,232,336 | Feb. 18, 1941 |
| Cook | 2,278,377 | Mar. 31, 1942 |

FOREIGN PATENTS

| Number | Country | Date |
|---|---|---|
| 440,367 | Germany | Feb. 1, 1927 |